(12) United States Patent
Yasui et al.

(10) Patent No.: US 7,419,039 B2
(45) Date of Patent: Sep. 2, 2008

(54) ROTATION TRANSMISSION DEVICE

(75) Inventors: Makoto Yasui, Iwata (JP); Koji Sato, Iwata (JP)

(73) Assignee: NTN Corporation, Osaka (JP)

( * ) Notice: Subject to any disclaimer, the term of this patent is extended or adjusted under 35 U.S.C. 154(b) by 388 days.

(21) Appl. No.: 11/352,265

(22) Filed: Feb. 13, 2006

(65) Prior Publication Data

US 2006/0185956 A1 Aug. 24, 2006

(30) Foreign Application Priority Data

Feb. 21, 2005 (JP) .............................. 2005-044144

(51) Int. Cl.
*B60K 23/08* (2006.01)
(52) U.S. Cl. .............................. 192/35; 192/38; 192/84.8
(58) Field of Classification Search .................. 192/84.8
See application file for complete search history.

(56) References Cited

U.S. PATENT DOCUMENTS 6,244,403 B1 * 6/2001 Ito et al. ........................ 192/35

6,769,524 B2 * 8/2004 Yasui et al. .................... 192/35
2004/0182670 A1 * 9/2004 Nojiri et al. .................... 192/38
2006/0090977 A1 * 5/2006 Goto et al. ..................... 192/35
2006/0180424 A1 * 8/2006 Sato et al. ...................... 192/35

FOREIGN PATENT DOCUMENTS

JP        2003-120719      4/2003

* cited by examiner

*Primary Examiner*—Richard M Lorence
(74) *Attorney, Agent, or Firm*—Wenderoth, Lind & Ponack, L.L.P.

(57) ABSTRACT

A rotation transmission device includes inner and outer rings, a two-way clutch mounted between the outer and inner rings, and an electromagnetic clutch mounted adjacent to the two-way clutch. The electromagnetic clutch includes a rotor guide pressed onto the outer ring at its open end and a rotor pressed into the rotor guide. The rotor guide is made of a magnetic material having the same or substantially the same coefficient of linear expansion as the material of the rotor. Thus, even when the rotor guide and the rotor are heated and expanded, the interference between the rotor and the rotor guide remains substantially constant. Therefore, the rotor and the rotor guide can be reliably coupled together with a simple structure and at a low cost.

2 Claims, 3 Drawing Sheets

Prior Art

ROTATION TRANSMISSION DEVICE

BACKGROUND OF THE INVENTION

The present invention relates to a rotation transmission device for selectively transmitting power from input to output members of a drive train.

JP patent publication 2003-120719A discloses a rotation transmission device for selectively transmitting driving torque to the front, auxiliary drive wheels of a four-wheel drive vehicle of the front-engine, rear-drive layout.

This conventional rotation transmission device includes an outer ring coupled to a propeller shaft, an inner ring coupled to a pinion shaft of a differential, and a two-way clutch mounted between the outer and inner rings. An electromagnetic clutch is provided adjacent to the two-way clutch to selectively engage and disengage the two-way clutch. When the two-way clutch engages, the outer ring and the inner ring are coupled together, so that the rotation of the outer ring is transmitted to the inner ring.

The two-way clutch includes a cylindrical surface formed on the inner periphery of the outer ring and cam surfaces formed on the outer periphery of the inner ring. The cylindrical surface and the cam surfaces define wedge spaces having narrow circumferential ends. Rollers are mounted between the cam surfaces and the cylindrical surface and are retained by a retainer. Relative rotation of the retainer and the inner ring causes the rollers to engage between the cylindrical surface and the cam surfaces. A switch spring is mounted between the inner ring and the retainer to bias the retainer to its neutral position where the rollers are disengaged from the cylindrical surface and the cam surfaces.

The electromagnetic clutch includes an armature rotationally fixed but axially movable relative to the retainer, a cylindrical rotor guide connected to the outer ring at its open end and covering the armature, a rotor inserted in the rotor guide from its open end and axially facing the armature, and an electromagnet axially facing the rotor. When the electromagnetic coil of the electromagnet is energized, the armature is attracted to and pressed against the rotor. The armature thus begins to rotate together with the outer ring and relative to the inner ring. The rotation of the armature relative to the inner ring causes the rollers to engage the cylindrical surface and the cam surfaces.

If the magnetic field produced when the electromagnetic coil of the electromagnet is energized to attract the armature to the rotor leaks through the rotor guide to the outer ring, the electromagnetic force to attract the armature decreases. This in turn reduces the torque transmitted from the outer ring to the armature, thereby making it difficult to reliably engage the two-way clutch.

To avoid this problem, that is, to prevent leakage of the magnetic field, conventional rotor guides are typically made of non-magnetic materials such as aluminum.

In such conventional rotation transmission devices, the rotor and the rotor guide are made of materials having different coefficients of linear expansion. Thus if the rotor is pressed into the rotor guide, when the rotor and the rotor guide are heated and expanded, there will not be enough interference left for the rotor to remain secured to the rotor guide.

Similarly, the rotor guide and the outer ring are made of materials having different coefficients of linear expansion. Thus, if the rotor guide is pressed on the outer periphery of the outer ring at its open end, when they are heated and expanded, there will not be enough interference left for the rotor guide to remain secured to the outer ring.

It is therefore necessary to provide, between the rotor 50 and the rotor guide 51 (see FIG. 5), means for preventing relative rotation, such as a protrusion 52 formed on the outer periphery of the rotor 50 and received in a cutout 53 formed in the rotor guide 51 at its end, and means for preventing axial movement, such as a snap ring 55 engaged in a groove 54 formed in the inner periphery of the rotor guide 51 at its end. It is also necessary to provide such means between the rotor guide and the outer ring. These means complicate the structure of the rotation transmission device and thus increase its cost.

The snap ring 55 makes it impossible to increase the axial length of the rotor 50, and thus the length of the portion of the rotor 50 axially overlapping with the electromagnet 56. It is therefore impossible to increase the magnetic attraction force for attracting the rotor 50.

An object of the present invention is to provide a rotation transmission device of the abovementioned type in which the rotor guide and the rotor can be coupled together with a simple structure and at a low cost and which includes means for increasing the magnetic attraction for attracting the armature to the rotor.

SUMMARY OF THE INVENTION

According to the present invention, there is provided a rotation transmission device comprising an outer ring, an inner ring mounted inside the outer ring, the outer and inner rings being rotatable relative to each other, a two-way clutch including engaging elements mounted between the outer ring and the inner ring for selectively engaging opposed surfaces of the outer and inner rings, and a retainer retaining the engaging elements, and an electromagnetic clutch mounted adjacent to the two-way clutch for selectively engaging and disengaging the two-way clutch, the electromagnetic clutch including an armature rotationally fixed and axially movable relative to the retainer, a cylindrical rotor guide connected to the outer ring at its open end and covering the armature, a rotor made of a magnetic material and pressed into an open end of the rotor guide to axially face the armature, and an electromagnet axially facing the rotor to attract the armature to the rotor when energized, wherein the rotor guide is made of a magnetic material having the same or substantially the same coefficient of linear expansion as the magnetic material of the rotor, the rotor guide being formed with a plurality of circumferentially elongated and circumferentially spaced apart slits, the slits being axially offset from a portion of the rotor guide into which the rotor is pressed.

With this arrangement, it is possible to minimize leakage of the magnetic field produced when the electromagnetic coil of the electromagnet is energized to the outer ring through the rotor guide. Thus, by energizing the electromagnetic coil, the armature can be reliably attracted to the rotor, so that it is possible to reliably engage the two-way clutch.

Also, by pressing the rotor into the rotor guide, the interference therebetween will remain constant when they are heated and expanded because they are made of magnetic materials having the same or substantially the same coefficients of linear expansion. Thus, the rotor and the rotor guide can be reliably coupled together without the need for means for preventing rotation and axial movement relative to each other.

Because means for preventing axial movement is not necessary, it is possible to increase the axial length of the outer cylindrical portion of the rotor and thus its portion axially overlapping the electromagnet, thereby increasing the magnetic attraction for attracting the armature to the rotor.

Preferably, the rotor guide, the rotor and the outer ring are all made of the same magnetic material. With this arrangement, by pressing the rotor guide onto the outer ring from its open end, the interference therebetween will remain constant when they are heated and expanded. Thus, the rotor guide and the outer ring can be reliably coupled together without the need for means for preventing rotation and axial movement relative to each other.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
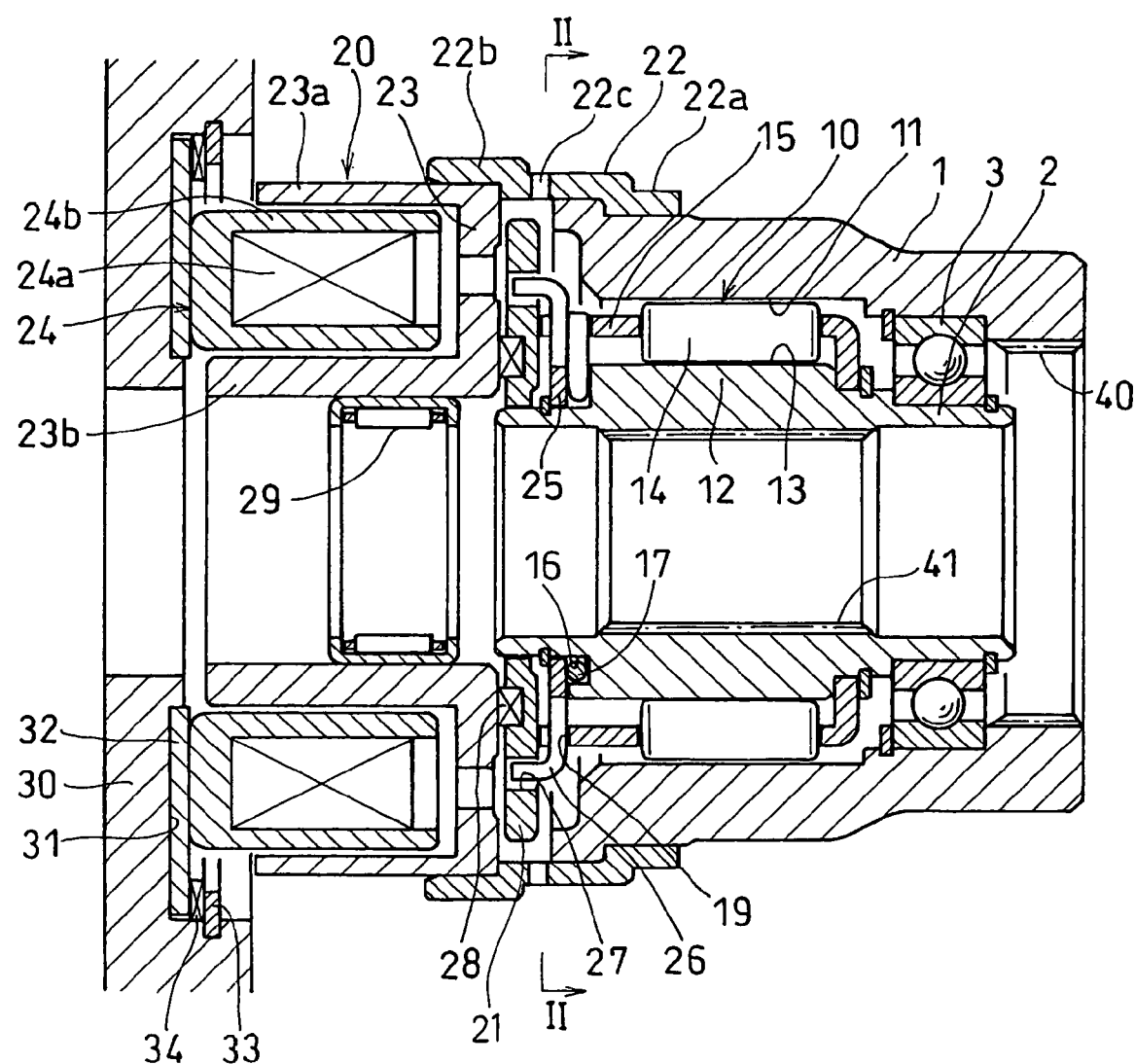
FIG. 1 is a longitudinal sectional front view of a rotation transmission device embodying the present invention.

Now, the embodiment of the present invention is described in detail with reference to the accompanying drawings. As shown, the rotation transmission device of the embodiment includes an outer ring 1 and an inner ring 2 mounted inside the outer ring 1. The outer ring 1 and the inner ring 2 are rotatably supported on each other through a bearing 3.

Between the outer ring 1 and the inner ring 2, a roller type two-way clutch 10 is mounted which comprises a cylindrical surface 11 formed on the inner periphery of the outer ring 1, a plurality of cam surfaces 13 formed on the outer periphery of a large diameter portion 12 of the inner ring 2 so as to face the cylindrical surface 11, rollers 14 each mounted in one of wedge-shaped spaces defined between the cylindrical surface 11 and the cam surfaces 13 and narrowing toward the circumferential ends thereof, and a retainer 15 holding the rollers 14.

Figure 2:
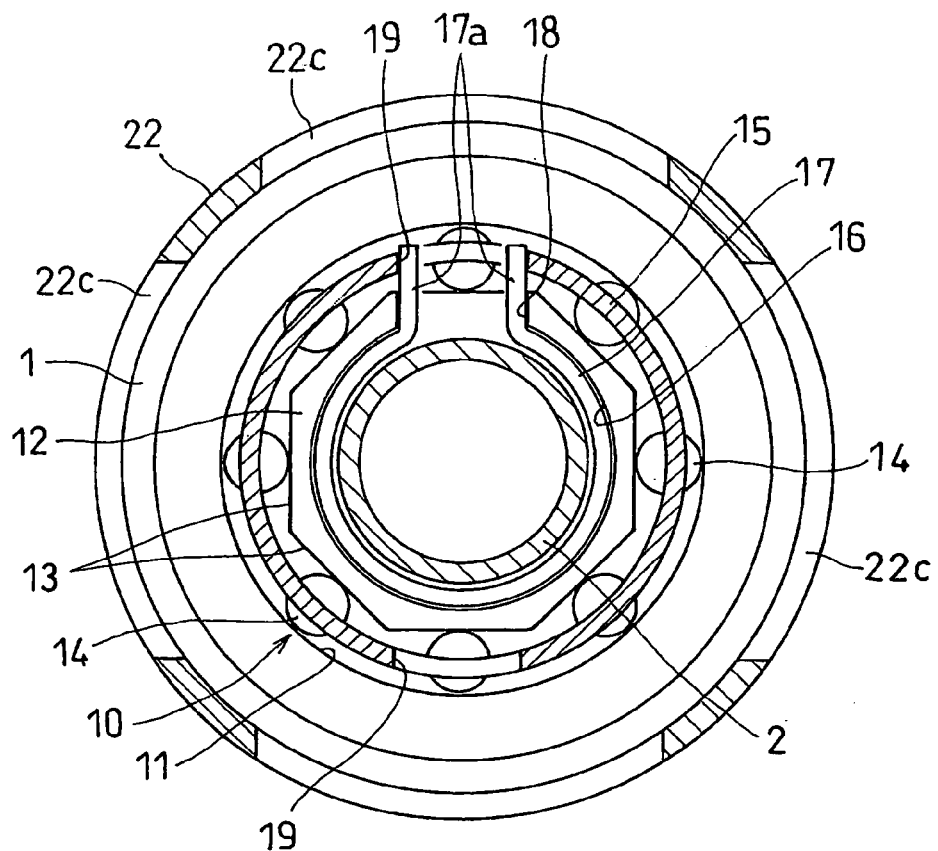
FIG. 2 is a sectional view taken along line II-II of FIG. 1.

As shown in FIG. 2, a C-shaped switch spring 17 is received in a recess 16 formed in an end surface of the large diameter portion 12 of the inner ring 2. The switch spring 17 has a pair of pressing portions 17a at both ends. The pressing portions 17a extend through a cutout 18 formed in the outer wall of the recess 16 and are inserted into one of a pair of diametrically opposed cutouts 19 formed in the end of the retainer 15. The pressing portions 17a press the circumferentially opposed sides of the cutout 18 and the one of the pair of diametrically opposed cutouts 19 circumferentially away from each other, thereby biasing the retainer 15 toward its neutral position where the rollers 14 are disengaged from the cylindrical surface 11 and the cam surfaces 13.

As shown in FIG. 1, adjacent to the two-way clutch 10, an electromagnetic clutch 20 is provided for selectively engaging and disengaging the two-way clutch 10.

The electromagnetic clutch 20 comprises an armature 21 arranged axially opposite to an end surface of the retainer 15, a cylindrical rotor guide 22 covering the armature 21, a rotor 23 received in an open end of the rotor guide 22 and having an annular portion arranged axially opposite to the armature 21, and an electromagnet 24 arranged axially opposite to the annular portion of the rotor 23.

A coupling plate 25 is inserted in the end portion of the retainer 15. Diametrically opposed L-shaped engaging pieces 26 are formed on the outer periphery of the coupling plate 25. The engaging pieces 26 are inserted in the cutouts 19 formed in the retainer 15, thereby rotationally fixing the coupling plate 25 relative to the retainer 15. The engaging pieces 26 are further inserted in engaging holes 27 formed in the armature 21. Thus the armature 21 is rotationally fixed but axially movable relative to the retainer 15.

Between the axially opposed surfaces of the armature 21 and the rotor 23, a separating spring 28 is mounted to bias the armature 21 away from the rotor 23.

Figure 3:
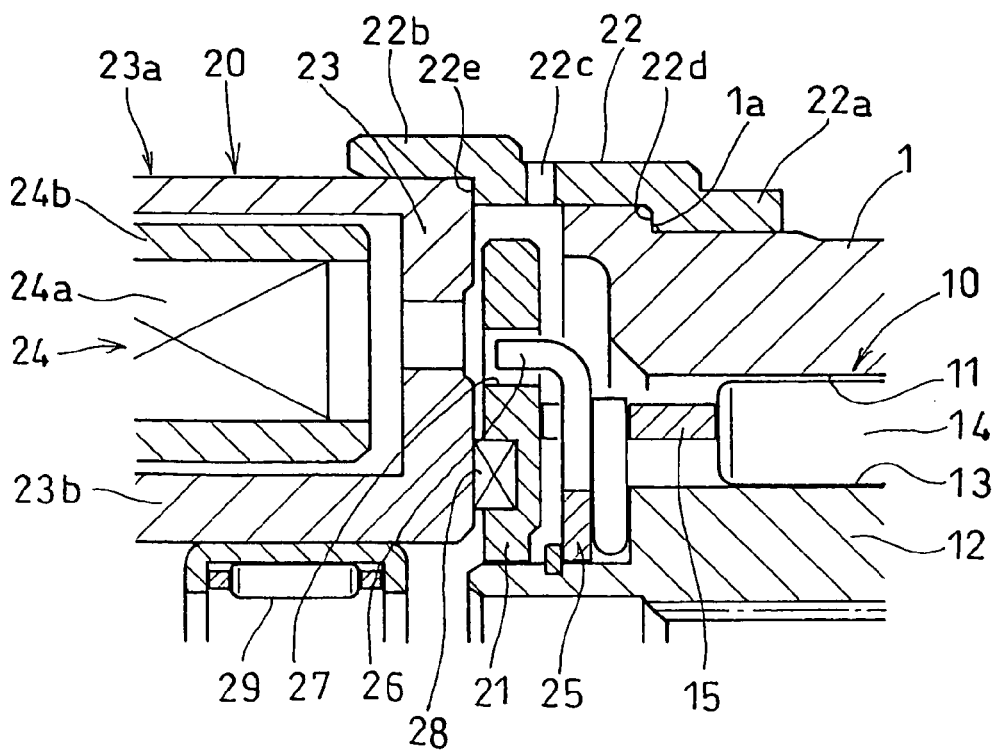
FIG. 3 is an enlarged sectional view of a portion of FIG. 1 where the rotor guide and the rotor are coupled together.
Figure 4:
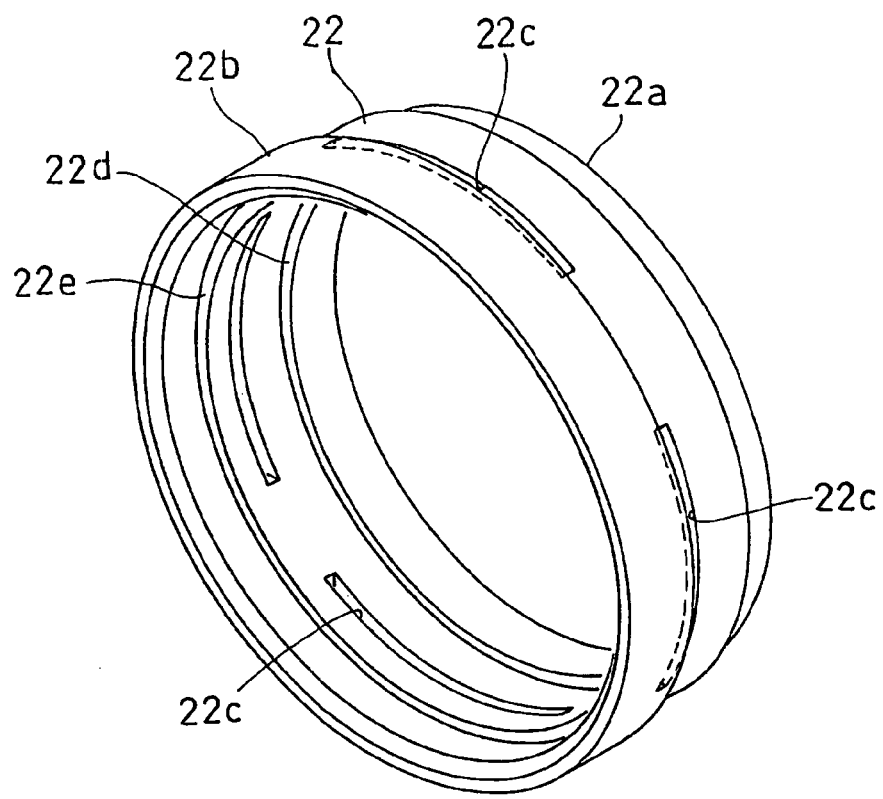
FIG. 4 is a perspective view of the rotor guide.
Figure 5:
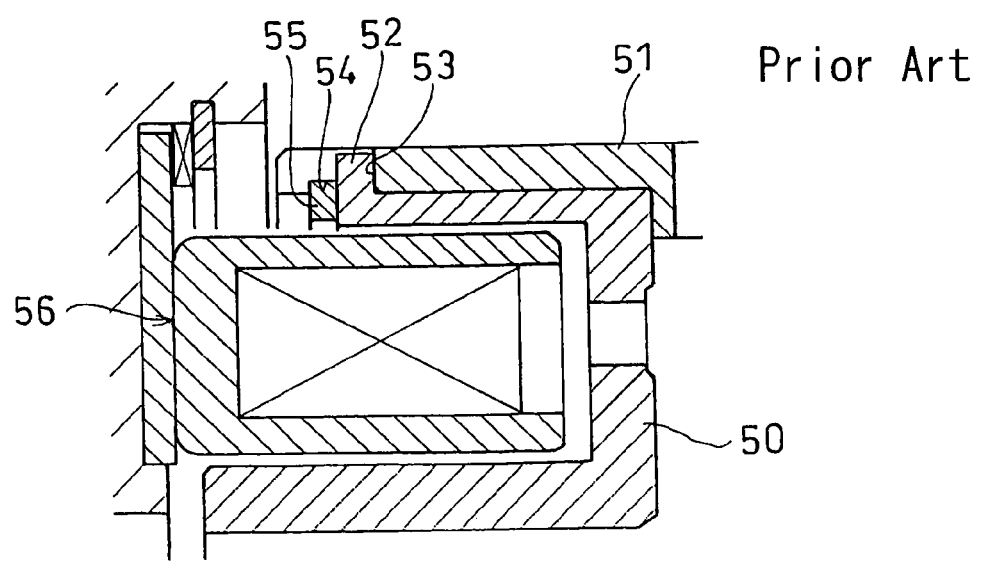
FIG. 5 is a sectional view of a portion of a conventional rotation transmission device where its rotor guide and rotor are coupled together.

As shown in FIGS. 3 and 4, the rotor guide 22 comprises a small-diameter cylindrical portion 22a at one end thereof, and a large-diameter cylindrical portion 22b at the other end. A plurality of circumferentially elongated slits 22c are formed circumferentially spaced apart from each other between the cylindrical portions 22a and 22b.

The rotor guide 22 is made of a magnetic material having the same or substantially the same coefficient of linear expansion as the magnetic material of the rotor 23 and the outer ring 1. Such magnetic materials include SPCC, which is a cold-rolled sheet steel, SCM, which is an alloy steel for machine structural use, and SAPH, which is a hot-rolled sheet steel for automobile structural use. The rotor guide 22 is formed by pressing.

The rotor guide 22 is pressed on the outer periphery of the outer ring 1 at its open end and positioned axially by the engagement of a shoulder 22d formed on the inner periphery of the small-diameter cylindrical portion 22a of the rotor guide 22 and a shoulder 1a formed on the outer periphery of the outer ring 1 near its open end.

The rotor 23 includes a radially outer cylindrical portion 23a and a radially inner cylindrical portion 23b both extending axially in the same direction from the radially outer and inner edges of the annular portion thereof, respectively. The outer cylindrical portion 23a is pressed into the large-diameter cylindrical portion 22b of the rotor guide 22 and axially positioned by a shoulder 22e formed on the inner periphery of the large-diameter cylindrical portion 22b. The inner cylindrical portion 23b is rotatably supported by a bearing 29 mounted inside the inner cylindrical portion 23b.

The electromagnet 24 is mounted between the outer cylindrical portion 23a and the inner cylindrical portion 23b of the rotor 23. The electromagnet 24 comprises an electromagnetic coil 24a and a core 24b having a U-shaped section and supporting the electromagnetic coil 24a with its open end facing the annular portion of the rotor 23.

As shown in FIG. 1, the core 24b is supported by a stationary member 30. The stationary member 30 is formed with a recess 31. To the closed end of the core 24b, a flange 32 is fixed. The flange 32 is received in the recess 31. Between the flange 32 and a snap ring 33 mounted on the inner periphery of the recess 31, an elastic member 34 is mounted to press the flange 32 against the end wall of the recess 31, thereby axially immovably holding the core 24b in position.

Input and output shafts (both not shown) are connected to the outer ring 1 and the inner ring 2 through splines 40 and 41 formed on the inner peripheries of the outer ring 1 and the inner ring 2, respectively.

FIGS. 1 and 2 show the state where the electromagnetic coil 24a of the electromagnet 24 is not energized with the rollers 14 of the two-way clutch kept in their neutral positions where the rollers 14 are disengaged from the cylindrical surface 11 and the cam surfaces 13 under the force of the switch spring 17.

Thus, in this state, the rotation of the outer ring 1 is not transmitted to the inner ring 2, so that the outer ring 1 rotates freely.

When the electromagnetic coil 24a of the electromagnet 24 is energized with the outer ring 1 rotating, the armature 21 is attracted to and pressed against the rotor 23, so that the armature 21 begins to rotate together with the outer ring 1. Since the armature 21 is rotationally fixed to the retainer 15, the retainer 15 also begins to rotate together with the outer ring 1 and thus rotate relative to the inner ring 2. The relative rotation of the retainer 15 causes the rollers 14 to engage between the cylindrical surface 11 and the cam surfaces 13. The rotation of the outer ring 1 is thus transmitted to the inner ring 2 through the rollers 14.

When the retainer 15 rotates relative to the inner ring 2, the switch spring 17 is elastically deformed. When the electromagnetic coil 24a of the electromagnet 24 is deenergeized in this state, under the restoring force of the switch spring 17, the retainer 15 rotates back to its neutral position where the rollers 14 are disengaged from the cylindrical surface 11 and the cam surfaces 13. Thus, the rotation of the outer ring 1 is not transmitted to the inner ring 2.

When the electromagnetic coil 24a of the electromagnet 24 is energized to attract the armature 21 to the rotor 23, magnetic field leaks through the rotor 23 to the rotor guide 22. However, the plurality of circumferentially elongated slits 22c formed in the rotor guide 22 minimizes leakage of the magnetic field to the outer ring 1. Thus, when the electromagnetic coil 24a is energized, the armature 21 can be reliably attracted to the rotor 23, which in turn makes it possible to reliably engage the two-way clutch.

The rotor 23 is pressed into the rotor guide 22. Since the rotor guide 22 is made of a magnetic material having the same or substantially the same coefficient of linear expansion as the material of the rotor 23, even when the rotor guide 22 and the rotor 23 are heated and expanded, the interference between the rotor 23 and the rotor guide 22 remains substantially constant, so that the rotor 23 and the rotor guide 22 are strongly and reliably coupled together.

This eliminates the need for means for preventing rotation and axial movement of the rotor guide 22 and the rotor 23 relative to each other. The rotor guide 22 and the rotor 23 can thus be reliably coupled together with a simple structure and at a low cost. This arrangement also makes it possible to increase the length of the outer cylindrical portion 23a of the rotor 23 and thus its portion axially overlapping the electromagnet 24, thereby increasing the magnetic attraction for attracting the armature to the rotor 23.

Similarly, simply by pressing the rotor guide 22 onto the outer ring 1, the outer ring 1 and the rotor guide 22 can be reliably coupled together with a simple structure and at a low cost, without the need for means for preventing relative rotation and axial movement therebetween.

The two-way clutch 10 of the embodiment is of the roller type. But the two-way clutch according to the present invention is not limited to this type. For example, it may be a sprag type two-way clutch using sprags as engaging elements. A sprag type two-way clutch includes inner and outer rings having cylindrical surfaces on their outer and inner peripheries, respectively, and sprags mounted between the cylindrical surfaces. The sprags are held by retainers having different diameters. The retainer having a smaller diameter is fixed to the inner ring. A switch spring is mounted between the retainer having a larger diameter and the inner ring. The switch spring keeps the large-diameter retainer at its neutral position where the sprags are disengaged from the cylindrical surfaces. By selectively energizing and deenergizing the electromagnetic clutch, the large-diameter retainer is brought into and out of engagement with the outer ring.

What is claimed is:

1. A rotation transmission device comprising:

an outer ring;

an inner ring mounted inside said outer ring, said outer and inner rings being rotatable relative to each other;

a two-way clutch including engaging elements mounted between said outer ring and said inner ring for selectively engaging opposed surfaces of said outer and inner rings, and a retainer retaining said engaging elements; and an electromagnetic clutch mounted adjacent to said two-way clutch for selectively engaging and disengaging said two-way clutch;

said electromagnetic clutch including an armature rotationally fixed and axially movable relative to said retainer, a cylindrical rotor guide connected to said outer ring at its open end and covering said armature, a rotor made of a magnetic material and pressed into an open end of said rotor guide to axially face said armature, and an electromagnet axially facing said rotor to attract said armature to said rotor when energized;

wherein said rotor guide is made of a magnetic material having the same or substantially the same coefficient of linear expansion as the magnetic material of said rotor, said rotor guide being formed with a plurality of circumferentially elongated and circumferentially spaced apart slits, said slits being axially offset from a portion of said rotor guide into which said rotor is pressed.

2. The rotation transmission device of claim 1 wherein said rotor guide is pressed onto said outer ring at the open end thereof.

* * * * *